United States Patent [19]

Lohr et al.

[11] 3,919,485

[45] Nov. 11, 1975

[54] CIRCUIT ARRANGEMENT FOR CENTRALLY CONTROLLED TELEPHONE EXCHANGE INSTALLATIONS HAVING CARRIER FREQUENCY DEVICES

[75] Inventors: Gunther Lohr; Franz Loffler; Alfred Schaller, all of Munich, Germany

[73] Assignee: Siemens Aktiengesellschaft, Berlin and Munich, Germany

[22] Filed: July 8, 1974

[21] Appl. No.: 486,500

Related U.S. Application Data

[63] Continuation of Ser. No. 208,112, Dec. 15, 1971.

[52] U.S. Cl. .......................... 179/15 BF; 179/18 ES

[51] Int. Cl.² .......................................... H04J 1/16

[58] Field of Search ........... 179/18 J, 18 ES, 15 BF, 179/175.2 C

[56] References Cited

UNITED STATES PATENTS

| | | | |
|---|---|---|---|
| 3,626,105 | 12/1971 | De Jean et al. | 179/18 ES |
| 3,634,627 | 1/1972 | Velentini | 179/15 BA |
| 3,646,277 | 2/1972 | Gueldenpfennig | 179/18 J |
| 3,691,306 | 12/1972 | Mold et al. | 179/15 BF |

*Primary Examiner*—Thomas W. Brown

[57] ABSTRACT

A circuit arrangement for centrally controlled telephone exchange installations having carrier frequency channels is described. The centrally controlled exchange has multiple stage switching matrices to the terminals of at least a portion of which are connected carrier frequency channels. The carrier frequency channels are grouped, and as groups are subject to continuous functional control, by a pilot supervision device. The line finder is developed as a central occupation memory with appropriate logical connections with the central control unit. The occupation memory reproduces the occupation condition of all parts of the switching matrix. A blocking signal is transmitted from the appropriate pilot supervision device, when a disturbance is noted in one of the carrier frequency channels in the group of channels associated therewith, to the occupation or line finding memory. This causes the memory to simulate the condition therein, that the switching matrix terminals to which the carrier frequency channels are connected are busy. This arrangement eliminates the need for occupation current circuits and associated switching devices, which are otherwise needed to test and block disturbed carrier frequency channels.

6 Claims, 4 Drawing Figures

INVENTOR

BY

INVENTOR

BY

INVENTOR

BY

INVENTOR

BY

CIRCUIT ARRANGEMENT FOR CENTRALLY CONTROLLED TELEPHONE EXCHANGE INSTALLATIONS HAVING CARRIER FREQUENCY DEVICES

This is a Continuation of application Ser. No. 208,112, filed Dec. 15, 1971.

BACKGROUND OF THE INVENTION

The invention relates to a circuit arrangement for telephone exchange installations, especially telephone exchange installations with central control and with multiple stage switching matrices over which connections can be made and wherein completed circuits are determined with the help of line finding devices. The invention is particularly useful in such installations which utilize carrier frequency channels connected to the switching matrix connections, which carrier frequency channels are combined in groups and which are, as a group, subject to continuous functional control by a pilot monitoring device for each individual group.

Through a reprint from the instructions to the German Post Office published in March of 1962, by the General Directors of the Postal Service in Hamburg, Federal Republic of Germany, under the authority of the Federal Minister for Postal and Telephone Affairs, having the title "Carrier Frequency Telephone Over Cables", it is known to subject carrier frequency channels collected in groups to continuous functional control, as a group, by a pilot monitoring device provided for each individual group. When one group of carrier frequency channels experience a disturbance, existing connections running over these channels are extinguished, and the carrier frequency repeaters corresponding to these channels are blocked against further use. For the simultaneous extinction of existing connections, it is further known from the aforementioned publication to carry them out, one after another, in order to avoid overloading further carrier frequency systems with which the previously mentioned disturbed channels are connected over selectors. In addition, through this time staggered extinction of a plurality of connections, an overloading of the power supply devices, which drive the selectors, is prevented. A special blocking apparatus facilitates the realization of this time staggered extinction.

For blocking against further use, the previously mentioned carrier frequency repeaters or closing circuits each has an occupation current circuit, which serves to determine the occupation condition (free or busy) of each of these closing circuits. Depending on the occupation condition of these closing circuits, selectors can or cannot utilize them.

There exists in such arrangements the problem to limit the expenses normally required for constructing carrier frequency repeaters or closing circuits.

SUMMARY OF THE INVENTION

The aforementioned and other problems are solved according to the invention in that the line finding device is developed in a known manner as a central occupation memory with appropriate logic connecting circuits, which occupation memory reflects the occupation condition (free or busy) of all parts of the switching matrix. A blocking signal is transmitted from the pilot supervision device, in case of a disturbance common to the affected carrier frequency channels, to the line finding memory with the effect that the occupation condition of those switching matrix contacts, to which the disturbed carrier frequency channels are connected, is simulated in the line finding memory.

According to the invention, the occupation current circuits, including the switching means (occupation relays and diverse relay contacts) contained therein, can be omitted in carrier frequency closing circuits. The purpose for which they were used in known circuit arrangements, i.e., blocking disturbed carrier frequency channels, from being used further, is fulfilled with advantageous utilization of the pilot supervision device provided in common for a group of carrier frequency channels. An appropriate blocking signal is transmitted directly to a central occupation memory for indicating the state of the channels of a given group. For the transmission of this blocking signal to the occupation memory, not all carrier frequency closing circuits need to individually demand the central control and to be individually successively connected to it. If the latter would occur, it would lead to a surge loading of the central control. Rather, the central control is demanded only a single time to register in the occupation memory a disturbance. In contrast to known devices, according to the invention, an immediate blocking of all switching matrix contacts connected with the disturbed carrier frequency channels is brought about. Thereby, the danger that a carrier frequency channel will still be occupied when it should be blocked is eliminated for those connection paths wherein successive extinction and blocking is attempted.

According to the invention, when a common signal channel is provided for a plurality of carrier frequency channels, for transmitting dial or switching signals to individual connection paths, the carrier frequency closing circuits, otherwise referred to as repeaters, can be completely eliminated in that the affected individual channel carrier frequency devices (channel converters) are directly connected to the switching matrix inputs and outputs.

DETAILED DESCRIPTION OF THE DRAWINGS

In the description hereinbelow the structural details and operating characteristics of certain of the illustrated elements are not discussed. An understanding of these is not necessary for enabling the manufacture and use of the invention, and such elements are known in the art.

Figure 1:
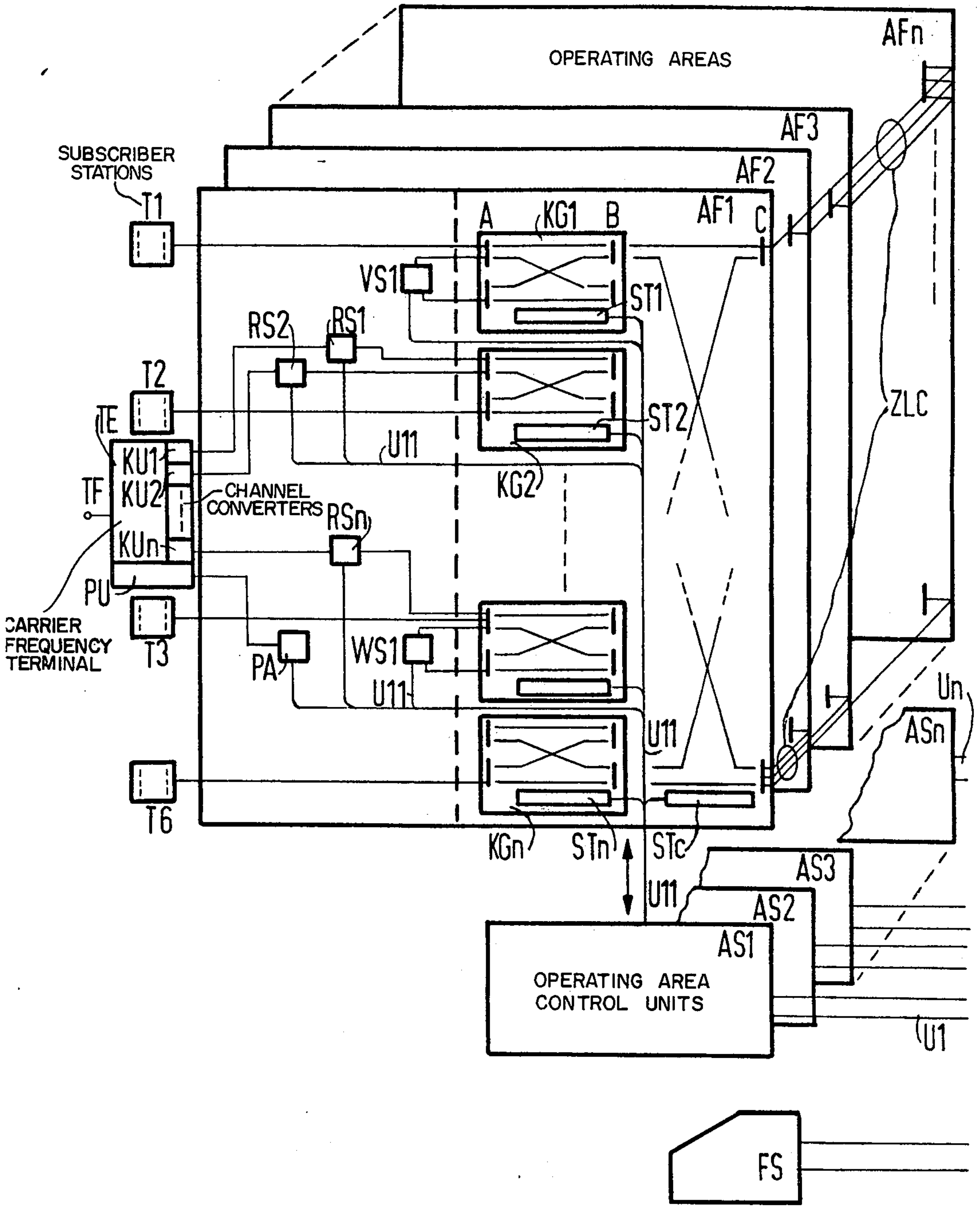
FIGS. 1 and 2 taken together are a diagrammatic representation of a telephone exchange installation to which the invention is applied.

In FIG. 1, a plurality of groups, AF1 through AF*n*, of individual apparatus are drawn. These groups are hereafter designated as operating areas. The operating areas, AF1 through AF*n*, are components of a larger exchange installation. Each of the operating areas is individually assigned an intermediate memory and code transformation device (buffer memory) AS1 through AS*n*, hereafter designated as operating area control unit. The operating area control units AS1 through AS*n* of the exchange installation are individually in connection, over two of lines U1 through U*n*, and over two common information collection-transmission memories, which hereafter are briefly designated as common memories, with two central control units ZS1 and ZS2. The arrangement of two common memories and two central control units increases of operational reliability of the entire exchange installation in reference to the possibility of a malfunction or of an interruption of operation of a central control unit by providing a back-up system. Also, the dual arrangement is used for monitoring errors through comparison of two informations processed independently of each other by two different central control units. Because this is not significant for the understanding of the invention, hereafter primarily only one single central control unit ZS1, one single collections memory, SS1 and in any given case, one single individual line, for example, U1, U2, etc., will be considered.

The operating areas each consist of a plurality of different individual apparatus. The latter term is to be understood, among other things, to refer to the coupling groups KG1 through KG*n* put together from individual coordinate switching multiples in the switching stages A and B of the three stage switching matrix. Each coupling group, for example, KG11, is associated with an individual setting device, for example, ST1, which carries out setting commands received from the operating area control unit. In any given case, one coupling group with an associated setting device forms an individual apparatus. Further, the totality of the switching multiples of the switching stage C with their setting device ST*c* are individual apparatus. It is also possible to combine these switching multiples in one operating area in a plurality of individual apparatus with individual setting devices. Individual apparatus also refers to connecting units, for example, VS1, etc., which are used for connections to be switched through within the exchange installations formed from the operating area AF1 through AF*n*, and carrier frequency units RS1, RS2 through RS*n*, which are individually associated with connecting lines (local or long distance) to exchange installations at other locations for incoming and/or outgoing connections. Dial receivers, for example, WS1, etc., to which subscriber stations are temporarily connected for the duration of the reception of the dialing information given off by the subscriber, are also counted among the individual apparatus. Further, pilot supervision connecting units PA — hereafter designated only as pilot units — explained below in detail are also within the definition of individual apparatus.

In addition, subscribed connection circuits (not shown) individual to each subscriber can be arranged as individual apparatus singly or collected in groups.

All of these individual apparatus of an operating area, for example, AF1, are connected with the pertinent operating area control unit, for example, AS1, over common circuits, for example, U11. Each individual apparatus contains connection means for connection to those circuits, which can be controlled by the operating area control unit. When a connection requirement is present in the individual apparatus, a connection signal is given off, in a manner described below in further detail, by the appropriate individual apparatus to the operating area control unit, which is there identified, and this leads to the giving off of a connection command to the affected individual apparatus. Each operating area control unit, for example, AS1, is also connected with the individual apparatus of its group — of its operating area — over those common circuits, for example U11, to which the individual apparatus can be individually connected.

The switching multiples of a plurality of operating areas at one place form a single common switching matrix, which solely for reasons, which are not causally related to the grouping of the switching matrix (for example, reliability, possibilities of extinction and questions of traffic loading), is subdivided into a plurality of competence regions of a number of operating area control units. The switching matrix formed from the switching multiples in the switching stages A, B and C of the operating areas AF1 through AF11 is constructed of switching multiples in three switching stages connected with each other over intermediate lines. At the inputs of the first switching stage (FIG. 1;A), subscriber lines, connection lines and all inputs and outputs of switching members required per connection for the production and supervision of connections, for example, connection units, VS1, dial receiver WS1, carrier frequency units RS1 through RS*n*, and the like, are similarly connected. The outputs of the switching multiples of the first through next to last switching stages, which are individually connected to the inputs of the switching multiples of the next successive switching stage, can be switched together pair-wise in this next successive coupling stage.

German Pat. DBP No. 1,235,379 shows and describes a switching matrix of this type. The special characteristic of such a switching matrix is that, from one switching matrix input, the outputs of each of the switching multiples can be reached over, at most, one single connection path. By this means, in the seeking of a path from one switching matrix input, through the selection of one of these outputs, the path to be put through over the switching matrix for the desired connection is already determined. The switching matrix, seen from its inputs to the outputs of its couplers, is constructed in a fan-like configuration. In spite of this, however, two switching matrix inputs can alternately be connected with each other over different paths, because, from the two switching matrix inputs, more and more common switching multiple ouputs are accessible. That is, more than once, each two switching multiple outputs belonging in different operating areas of the last switching stage, and fixedly connected over an intermediate line, ZLC, to the last switching stage are accessible.

For all connections to be switched through over the switching matrix, all of the required through-switching data is determined from the central control unit ZS1, which simultaneously serves as a line finding device with reference to dialing information previously received over an operating area control unit. A central information memory ZJS simultaneously serves as a line finding memory (also known as occupation memory). The method of line finding using a line finding or occupation memory is known from a number of different patent literature citations.

The central information memory ZJS contains, among other things, storage elements, one for each part of the switching matrix (inputs, outputs and intermediate lines). With the aid of these memory elements, it can be read at any moment, what the condition (free or busy) of all parts of the switching matrix is. With the help of the central information memory ZJS, the central control unit ZS1 determines, preparatory to each desired connection completion, over which path in the switching matrix, a through-switching can be realized.

The result of the latter determination is expressed in appropriate through switching data, which is communicated over the affected operating area control unit, to the affected setting devices. The setting devices, in the known manner, then undertake the setting of the affected switching means.

As was mentioned, the operating areas, for example, AF1, each have three switching stages with switching multiples which are connected over intermediate lines in such a manner that each one switching multiple output in the first through next to last switching stages A and B is individually fixedly assigned a switching multiple input in the second through last switching stage B and C. The outputs of the switching multiples of the switching stage C are partially unwired in the operating areas AF1 through AFn. The substantial portion, however, are individually connected together in pairs over intermediate lines ZLC leading from operating area to operating area.

One program memory PS1 and PS2 each is associated with the two central control units ZS1 and ZS2 arranged next to each other. The central control unit takes from the program memory, the necessary commands, according to which program (for example, line finding) is to be processed, as determined by the information given off by an operating area control unit and received over the associated collection memory SS1 in the central control unit.

Figure 2:
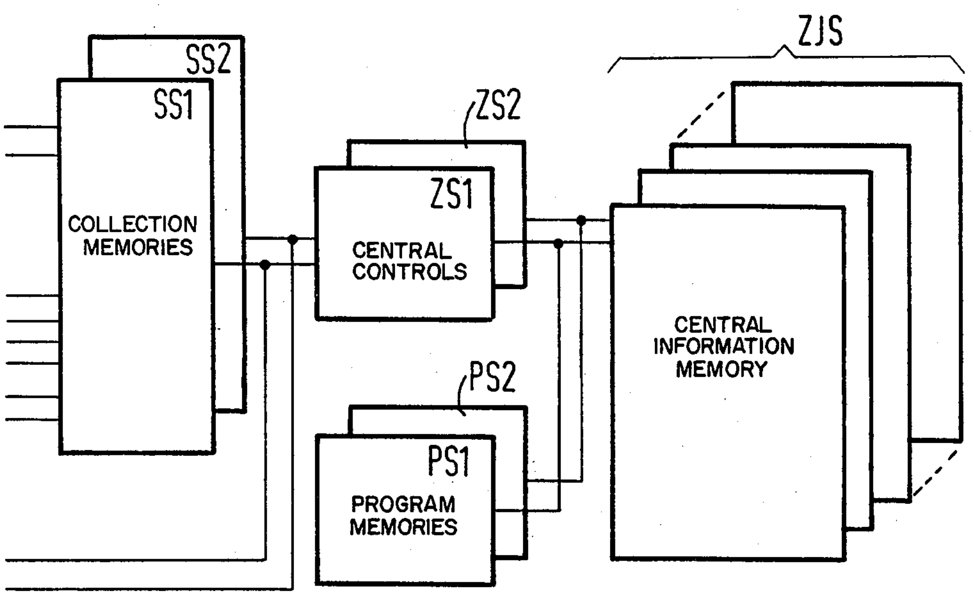
Figure 3:
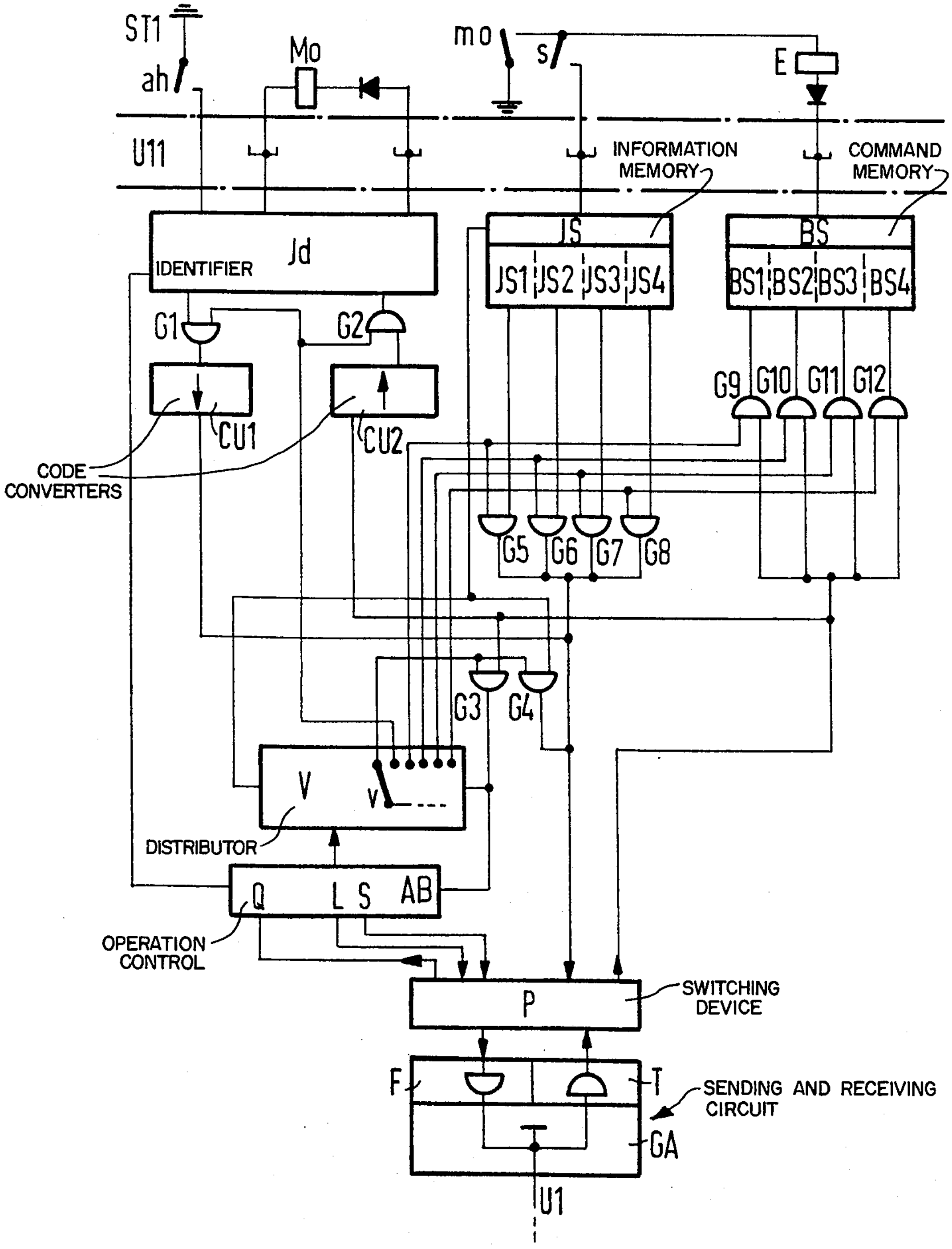
FIG. 3 is a schematic diagram of one of the operating area control units in the FIG. 1 embodiment with associated circuitry and FIG. 4 is a schematic diagram of the common memory in the FIG. 2 embodiment with associated circuitry.

In FIG. 3, further details of an operating area control unit, as shown in FIG. 1, are represented. The operating area control unit is in connection on the one side over its current circuits, for example, U11, common to its associated individual apparatus with the individual apparatus, for example, the setting or engagement device ST1 of the coupling group, KG1, and on the other side over an individual line U1 with the collection memory SS1 shown in FIG. 2, associated with the central control unit ZS1.

The operating area control unit shown in FIG. 3 can be demanded by the individual members, for example, by the setting device ST1. With the help of an identifier *Jd*, the operating area control unit is in a position to select from among a plurality of simultaneously present connection stimuli, which are switched over demand contacts, for example, *a*h, and to give off a corresponding switching command to the connecting relay, for example, M*o*, corresponding to the pertinent connection stimulus. The demand current circuits run from each individual apparatus singly to the operating area control unit. The connecting relays, for example, M*o*, of the individual apparatus lie in a controlling matrix extending over all individual apparatus.

With the help of contacts mo of the appropriate connecting relay, M*o*, contacts *s*, as well as windings E, are switched into operation by relays of the setting device ST1. The common current circuits U11 connected with the contacts s and the windings E are multiple arteries. Likewise, relay contacts *s* and relay windings E of the setting device ST1 are (in contrast to the simplified representation in the drawings) each to be provided in multiples. For a transfer of information to and from the operating area control unit, its switching elements and those of the associated individual apparatus are, with the avoidance of line influence, capable of direct signal exchange. The information to be transmitted in any given case, over the mentioned common current line, for example, U11, may be in the form of a plurality of simultaneous signals. In the present case, the represented switching means are electromagnetic relays or contacts thereof. It may, however, be advantageous to utilize other switching means, for example, any of the known electronic switching means, which would be suitable for this purpose.

As has previously been described, the current circuits common to each operating area and to the associated individual apparatus facilitate the mutual transfer of information through direct exchange of signals.

Figure 4:
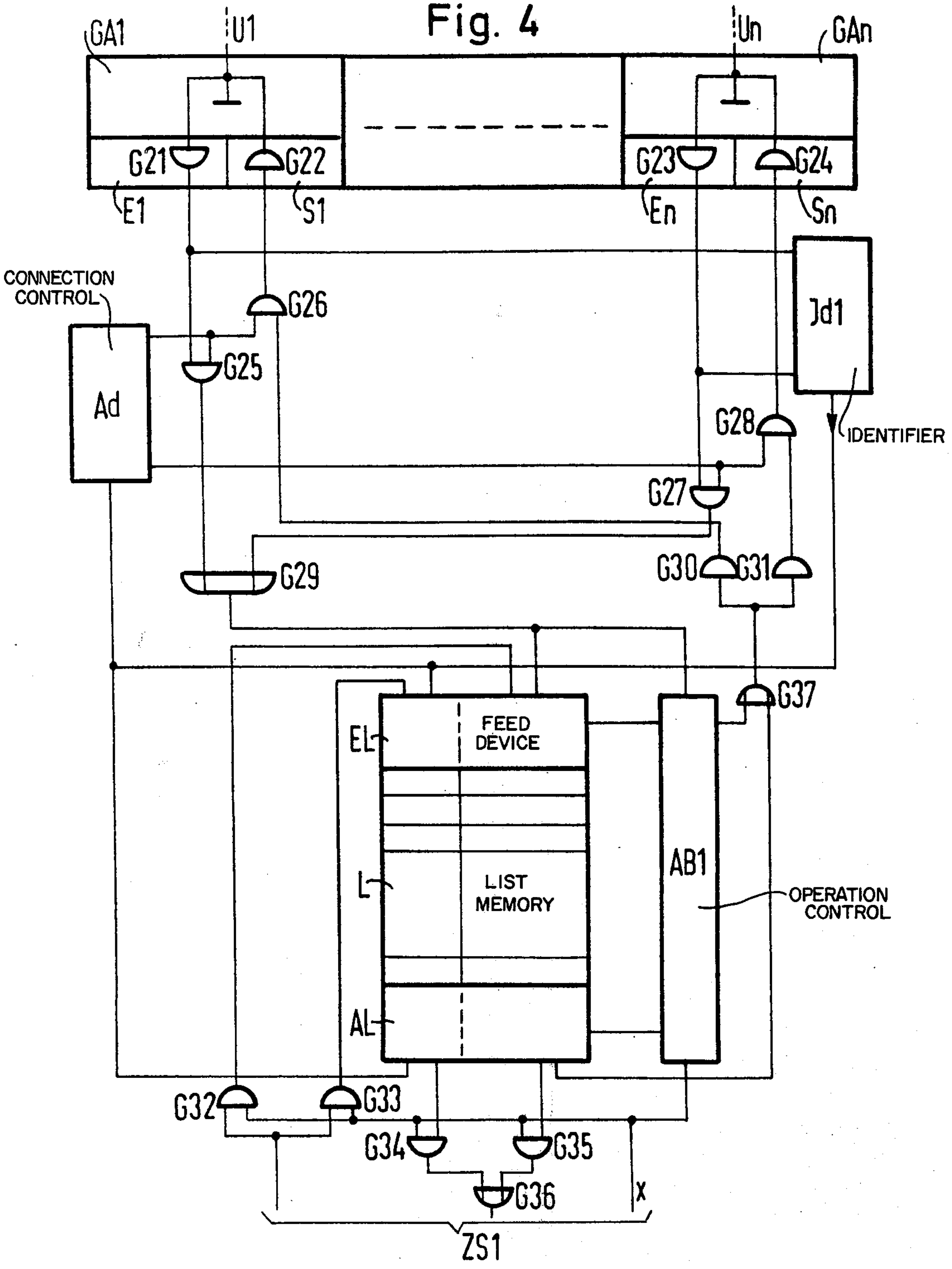

For the transmission of information between the collection memory SS1 and the operating area control devices lines U1 through U*n* are used. Each line is individually connected to a single operating area control and to the collection memory. These are hereafter designated as individual lines. Each of these lines, for example, U1, is equipped at each end (see also FIG. 4) with a sending circuit and a receiving circuit of known construction, for example T/F/GA and E1/S1/GA1. These may be selected with regard to the technical transmission characteristics of the individual line. Each of these lines is — as FIGS. 3 and 4 show — constituted by two wires. A four wire terminating set serves as sending and receiving circuit, for example, GA, GA1, with a sending portion, for example, F, S1, and a receiving portion, for example, T, E1. Each four wire terminating set is equipped with an appropriate balancing network in the known manner for the accommodation of the technical characteristics of the transmission line.

Some additional operational definitions should be given preparatory to a description of the manner of operation of the operating area control unit. As is already to be taken from the above explanations, information is transmitted from the individual apparatus to the essential control unit, as well as from the central control unit to the individual apparatus. In each case in addition to the collection memory SS1 the operating area control units serve as intermediate members. The transmission of information from one individual apparatus to the collection memory SS1 is hereafter always designated as reading. The opposite transmission of information from the collection memory to an individual apparatus will always be designated as writing. Accordingly, the reading and writing signals are formed in the operating area control unit. The infomration to be transmitted in to the individual apparatus by the central control unit is hereafter designated only as commands.

The read signal is always formed in the operating area control unit, when based on a demand on the part of an individual apparatus, for example, from the setting device ST1 over the demand contact *a*h. This apparatus has been connected with the operating area control unit (relay M*o*) and has transferred data to its information memory AS, which is now to be transmitted to the collection memory SS1. Further, the formation of the read signals requires that all switching processes of preceding functional operations be completed. If, in contrast, no demand of this type on the part of an individual apparatus is present, then the write signal is formed in the operating area control unit to express the readiness of the operating area control unit to receive information, which in some cases may be present in the collection memory SS1 and is to be transmitted to this operating area control unit.

It is possible that neither a demand by an individual apparatus is present, nor that the operating area control unit is prepared to receive information. This operating condition exists when an operating area control unit is not yet finished with the processing of an information. In this case, the operating area control unit is prepared for no exchange of information with the common memory. A block signal is then formed in the operating area control unit.

Referring to FIG. 2, the described read, write and block signals are formed in an operation control AB of the operating area control unit. The read signal is transmitted over an output L thereof, and the write signal is transmitted over the output S of the operation control. The block signal requires that the read and write signals are simultaneously transmitted. But, it is also possible to cause the block signal through the absence of the two read and write signals or to provide a special signal circuit for this purpose. These signals, formed in the operating area control unit, are passed on to a switching device P. If the read signal is present in the operating area control unit, the switching device P gives off a demand signal over the line U1 to the collection memory. If, in contrast, the write signal or the block signal is present in the operating area control unit, then the switching device P emits only other appropriate switching signals over the line U1 to the collection memory, insofar as the collection memory has previously emitted a corresponding demand signal to the operating area control unit.

As mentioned hereinabove, the apparatus not described in detail herein is of known construction, and this is true of operation control AB and switching device P. However, if more details of the construction or operation of operation control AB are desired, these will be found in allowed, commonly assigned, U.S. application Ser. No. 146,292, filed May 24, 1971, (now U.S. Pat. No. 3,775,565by reference to the description of program control AB given therein in conjunction with FIGS. 4(*a*) and 4(*b*). The switching device P corresponds to the logic gates G13, G14, G15, and G21 in the same application.

The common memory SS1 (FIG. 2) is shown again in FIG. 4 in further detail. The lines U1 through U*n*, individually associated with the operating area control units, each have in the common memory SS1 (FIG. 4) a sending and receiving circuit per operating area. In addition the common memory has a connection device for each operating area, which connection device in the working example in the given case consists of two coincidence gates, for example, G25 and G26, for the operating area control unit.

The identifier J*d*1 in the common memory is illustrated, and it facilitates reception of the demand signals given off by the operating area control units and selects in any given case one single demanding operating area control unit. After each identification operation, J*d*1 gives off the address of the affected operating area control unit in coded form. Further, the connection control Ad in the common memory is mentioned, and based on a coded address transmitted to the connection control A*d* of an operating area control unit, it gives off an appropriate connection signal to the coincidence gates, for example, G25 and G26, which correspond to the given affected operating area control unit. These gates facilitate the control units connection. The operating area control unit according to FIG. 3 and the common memory according to FIG. 4, are described together hereafter.

If, in an operating area control unit, the read signal is present, then, as has previously been described, a corresponding demand signal is transmitted over the associated individual line U1 to the common memory. Here it arrives at identifier J*d*1, which carries out an identification operation, and gives off the address corresponding to the operating area control unit in coded form. This address is offered to a list memory L over feed device EL, as well as also transmitted to the connection control A*d*, which for its part, with the help of the appropriate gate switches, for example, G25 and G26 brings about the connection of the individual line U1 corresponding to the affected operating area control unit. Thereafter, the operation control AB1 of the common memory gives a callback signal to the connected control unit over the gates G37, G30 and G36. The recall signal is transformed in the switching device P (FIG. 3) and is transmitted as a receipt signal to the input Q of the operation control AB of the operating area control unit.

The information is transmitted from the operating area control unit to the selection memory in a plurality of successive segments. Each information part is separately introduced and confirmed through special signals. This and the segmental transmission of information are more fully explained hereafter.

Each information is sub-divided to a plurality of information parts. All information is binary coded. Over the current circuits, for example, U11, which are common to the individual apparatus of an operating area and which can connect the individual apparatus with their operating area control unit, all switching signals of a piece of information to be transmitted to the central control unit are simultaneously passed on from the given individual apparatus to the operating area control unit. Depending on the extent of this information, the information is sub-divided in the operating area control unit in a maximum of four information parts. In the information memory JS for each of the four information parts a part of this memory JS is provided: JS1, JS2, JS3 and JS4. Likewise, in the command memory BS for each of four information parts, a part of the memory BS is provided: BS1, BS2, BS3 and BS4. The different designation of information memory JS and command memory BS signifies that for the central control unit in one case it pertains to readable information and in the other case it pertains to writable commands. These concepts have previously been defined.

Each piece of information consisting of a plurality of information parts and each command consisting of a plurality of command parts is supplemented for transmission over the transmission line U1 by a length indication and an address, which designates the given individual apparatus. The length indication is obtained in the following manner: The part memories JS1 through JS4 forming the information memory JS each serves to receive an information part. The extent of an information is determined by the number of the information parts. This number is the length indication. It is determined in the common part of the information memory JS. This is easily possible, in that the number of the part memories used in the storage of a piece of information is determined in a known manner. The length indication is transmitted as a coded signal by the common part of the information memory JS to the distributor V and there stored.

Before an information transmission or command transmission over the common current circuits U11, the length indication is transmitted. It expresses what quantitative measure of the information or the command thereafter transmitted is. If the total content is expressed, instead of in four information parts or command parts, in fewer parts, then the information or command transmission is restricted correspondingly to fewer information parts or command parts. Through the previous length indication, the given receiver, that is the given operating area control unit or the common memory, knows when the given information transmission or command transmission will be completed.

In addition the previously mentioned address indication precedes each one of this type of transmission. Thus, it is always indicated in advance from which individual apparatus a piece of information comes or for which individual apparatus a command is designated.

It has previously been explained, that each piece of information is sub-divided into a plurality of information parts. The largest extent of a piece of information is determined by four information parts. The address indication directly preceding the information parts on the transmission line U1 of the second type can additionally take in the extent of one or two information parts. The length indication preceding the address indication in the present exemplary embodiment takes in a maximum of the extent of one information part.

The length indication, the address indication and the maximum four information parts or command parts are intermediately stored and code transformed in the operating area control unit in equally sized groups of binary code elements. Each code element includes one bit. A certain number of bits, for example, 8, forms a group of binary code elements. Such a group is designated in contrast to bit as a Byte. Thus, the length indication includes one Byte, the address of the affected individual apparatus two Bytes and the information or the command includes in any given case a maxmimum of four Bytes. The first Byte, containing the length indication, the second and third Bytes, containing the address indication, and in the present example, a maximum of four further Bytes containing a piece of information or a command, all taken together form a word. The transmission of a word over the individual line U1 is controlled with auxiliary signals. These auxiliary signals are read (L), write (S), block (L+S), as previously described, and receipt (Q). For the transmission of such a word the individual Bytes stored in the information memory JS are offered to one input each of the gates G4, G5, G6, G7 and G8 (FIG. 3). The gates G4 through G8 here symbolically express that the given piece of information applied to one of their inputs can be transmitted, when an appropriate signal for the transmission is applied over the other given input of the gate. This signal is successively applied to the different gates G1 through G12 by a distributor V with the help of its switching arm v, so that the individual Bytes come to be transmitted in succession, and indeed, in the order of, first the length indication, then the address of the affected individual apparatus and then the information or the command. The represented gate circuits G4 through G8 are to be understood as gate circuits for code signals containing one Byte each, the code elements of which are successively individually transmitted in a manner not shown in detail.

The previously mentioned distributor V is controlled by the operation control AB. When the operating area control unit has been demanded by one of the individual apparatus, as soon as the information and the length indication in the information memory JS and the address in the identifier Jd are ready for transmission, and insofar as the length indication is transmitted to the distributor V causing the distributor to assume a rest position, corresponding signals are transmitted, in a manner not described in detail, from the distributor V and from the identifier Jd to the operation control AB. These signals cause the operations control to emit the read signals to the switching device P. As described, the switching device P emits a demand signal to the common memory (FIG. 4). The common memory undertakes, as also previously described, an identification and a connection of the appropriate operating area control unit. Thereupon, the operation control AB1 of the common memory sends a callback signal to the operating area control unit over the gates G37, G30, G26 and the line U1. This signal is received by the switching device P and passed on as receipt signal to the operation control AB of the operating area control unit and enters the operation control over its input Q. The operation control AB thereupon successfully undertakes, by means of the distributor V, the transmission of the length indication of the address of the affected individual apparatus and of the information consisting of a maximum of four information parts.

Simultaneously with the operations of the connection gates G25 and G26 and of the information callback, the common memory has prepared the above information reception. The address given off by the identifier Jd1 in binary coded form has been, under the control of operation control AF1, written over the feed device EL of the list memory L, in the left part of a first free memory line. This address refers to the address of the affected operating area control unit, which must not be confused with the address of the given individual apparatus.

If, now, the common memory receives the word consisting of the length indication, address of the individual apparatus and information, these data arrive in the affected, correspondingly prepared memory line of the list memory L over the gate circuits G25 and G29 and the feed device E. The process of transmission for a word is described hereafter in further detail.

The common memory receives first the length indication transmitted by the operating area control unit over the line U1. As soon as the common memory has received the length indication, a receipt signal arrives over input Q to operation control AB. The operation control AB then emits a pulse to advance the distributor V. The distributor advances its switching arm v further by one step. Coincidentally, the gate G4 blocks the passage of the length indication, and the gate G1 is opened for the transmission of the address from the identifier J*d* to the code converter CU1. In the meantime, the common memory is also prepared, in a manner not described herein in detail, for receipt of the address of the individual apparatus. This address is now transmitted from the operating area control unit to the collection memory and written in the previously mentioned memory line. The operation control AB of the operating area control unit once again receives a receipt signal over its input Q.

In the same manner, the information parts are transmitted after the address of the individual apparatus in the form of further Bytes from the operating area control unit to the common memory. The length indication has previously been stored in the distributor V. Therefore, in the operating area control unit the end position of the transmission of information can be determined. Because the length indication has been transmitted to the common memory, in addition to being received in the list memory L, it was also received by the operation control AB1; the same also holds for the common memory. After receipt of the last information part of a word, the common memory gives a call-back signal to the operation control AB of the operating area control unit for the last time.

After the common memory has received the information, besides the length indication and address of the affected individual apparatus, and has stored it together with the address of the affected operating area control unit in a line of the list memory L, it disconnects itself once again from the individual line Q11, and thus, from the operating area control unit AS1. The common memory now stands ready to receive further information. It connects itself singly in the previously described manner successively to the different operating area control units and receives successively, one after another, information with length indication and address from different individual apparatus over the different operating area control units and stores it individually and successively in the lines of the list memory together with the given address of the affected operating area control unit.

Either when the list memory L of the common memory is full or in a given case at certain fixed time intervals, the central control unit ZS1 connects itself to the collection memory SS1. The central control unit gives an appropriate demand and connection signal over the line *x* (FIG. 4) to the common memory, and this signal reaches the gate circuits G34 and G35, as well as the operations control AB1. In a manner not represented in detail, the common memory SS1 transmits, with the help of its operations control AB1 and of its output device AL, the entire contents of its list memory to the central control unit in one stroke. In any given case, those contents will be constituted by the address of the pertinent operating area control unit, the length indication, the address of the given individual apparatus and the information. In this manner, the contents of the list memory L is read line by line successively one after the other to the central control unit.

In a corresponding manner commands together with the addresses of the operating area control units are transmitted by the central control unit in multiples to the common memory. This aspect of the preferred embodiment is not further described herein, because an understanding of it is not needed for an understanding of the invention.

Having described a central control telephone exchange installation in which the invention is applied the features of the invention will be further described hereinbelow.

The carrier frequency line units RS1 through RSn shown in FIG. 1 have previously been mentioned. These line units are also commonly designated as carrier frequency repeaters.

Carrier frequency repeater systems for use in telephone installations are well known so that the complete structural details of same will not be discussed herein. A carrier frequency section includes, as is known, a number of carrier frequency channels, each of which can be utilized for the production of a telephone connection. The carrier frequency section has a carrier frequency end apparatus TE at both of its ends. This carrier frequency end apparatus includes, in a known manner, devices for the modulation and demodulation of the carrier frequency bands corresponding to the channels. The known arrangements for the latter are intended to be used. In the carrier frequency end apparatus a channel converter, for example, KU1, KU2 through KU*n*, is associated with each channel. Likewise, in the telephone exchange installation a carrier frequency line unit, for example, RS1, RS2 through RS*n*, is associated with each channel. The line units in a known manner send and receive dial signals and the like from the particular channel over the appropriate operating area control unit to the central control unit and vice versa. They can be connected to the appropriate operating area control unit in the manner previously described for other individual apparatus in order to enter into the required exchange of information with the central control unit.

The carrier frequency line units used herein, in contrast with known circuit arrangements for carrier frequency line units, have no test current circuits and occupation current circuits for determining and indicating the occupation condition (free or busy) of the given line unit. As has previously been explained, the central information memory ZJS associated with the central control unit ZS1 in the known manner indicates the occupation condition of each of the individual apparatus. The central control unit and the central information memory act also as a line finding device and occupation memory (also designated as line finding memory). In the latter, the occupation conditions (free or busy) of all parts of the switching matrix are stored, as well as, the occupation conditions of all switching matrix inputs and outputs. For this reason, it is superfluous to also equip the carrier frequency line units with occupation current circuits. The occupation condition (free or busy) of each of the carrier frequency line units can be determined in the central information memory. As has already been indicated, the carrier frequency line units can also be entirely omitted and the appropriate individual channel carrier frequency end devices (channel converters) can be directly connected to the switching matrix, when the connection paths, which can be switched over these carrier frequency channels, are operated with a central signal channel (see German Pat. publication DAS No. 1,209,903).

As has previously been explained, it is already known to subject carrier frequency channels combined in groups to continuous function control by an individual group pilot supervision device for each group. A pilot supervision device PU in FIG. 1, which is associated with the carrier frequency end apparatus TE serves this purpose.

The construction and manner of operation of all devices used for the pilot supervision of the carrier frequency are presumed to be known based on the previously listed patent literature. Accordingly, in case of a disturbance of the carrier frequency channels of a group, existing connections, which run over these channels are extinguished, or the carrier frequency line units corresponding to these channels are blocked against new occupation. To this end, the pilot supervision device PU in the carrier frequency end apparatus TE transmits, in case of a disturbance, an appropriate signal to the pilot unit PA associated with the pilot supervision device. In the manner extensively described above, for the setting device ST1, the pilot unit PA now gives off a corresponding connection stimulus to the identifier J*d* (FIG. 3) of the affected operating area control unit. As soon as this operating area control unit receives the connection stimulus and gives back a corresponding connection command to the pilot unit PA, this pilot unit connects itself to the information memory JS of the operating area control unit over the current circuits U11 common to the operating area. Thereafter, the pilot unit transmits information to the operating area control unit to the effect that those carrier frequency channels, which are subject to pilot supervision through the corresponding pilot supervision device, are affected by a technical disturbance. Connections which run over these channels are to be extinguished. It is to be especially prevented that new connections are switched through over these disturbed carrier frequency channels.

The disturbance indicating information which includes the addresses of the carrier frequency line units which are all supervised in common and which correspond at the time to the disturbed channels, is transmitted from the operating area control unit in the previously described manner over the common memory SS1 to the central control unit ZS1, and the central control unit learns which carrier frequency channels have been affected by a disturbance. Corresponding to this information, the central control unit undertakes without delay an appropriate simulation in the central information memory ZJS serving among other things as occupation memory. The switching matrix terminals wired with the effective carrier frequency line units are indicated as busy (occupied) in the central information memory ZJS irrespective of their actual occupation condition. That is, the occupied condition of those switching matrix contacts to which the disturbed carrier frequency channels are connected is simulated. It is also possible to distinguish the actual type of occupied condition in the occupation memory between the actual condition of occupation (the use of a switching matrix contact by a switched through connection) and blocking, for example, because of a disturbance. Existing connections, switched through over the disturbed carrier frequency channels are successively extinguished, in a manner not described in detail herein, by the central control unit.

In an advantageous modification of the described invention, it is also possible in order to simplify the functional operations to limit the information to be transmitted from the pilot unit in case of a disturbance to the central control unit to the fact of the disturbance. The central control unit automatically evaluates this information together with the address of the affected pilot unit to the extent that the central control unit derives on its own the addresses of the switching matrix connections wired with the disturbed carrier frequency channels and undertakes a corresponding simulation in the occupation memory.

In conjunction herewith, a larger number of pilot units can be combined in a useful manner into a common device, which device has a common address in the central control unit for the affected pilot units. The pilot units combined in this manner are made to be distinguished for the central control unit at the registration of a disturbance therein in that a correspondingly differentiated piece of information is transmitted to the central control unit utilizing the available broad information spectrum. This information would thus designate which of the pilot units contained in the common device is having its corresponding carrier frequency channels affected by a common disturbance.

Returning to the illustrated embodiment, as soon as the disturbance condition is terminated, the pilot unit PA again demands the operating area control unit associated therewith. In the manner described for the disturbance information indicating the end of the disturbance is once again transmitted in common for the affected carrier frequency channels from the pilot unit over the operating area control unit and the common memory SS1 to the central control unit ZS1. The central control units ZS1 then indicates as free the switching matrix inputs corresponding to the affected carrier frequency channels in the central information memory ZJS. In further line finding operations for the production of new connections, these switching matrix inputs and the carrier frequency line units, which correspond to them, along with their associated carrier frequency channels, can again be utilized for the switching through of connections.

In modifications in accordance with the invention, it is also possible to so develop the pilot unit that after the sending of a first disturbance registration, it continually repeats this disturbance registration at equal time intervals. Thereby, the continuation of the disturbance condition is indicated to the central control unit. In contrast, an absence of this repeated disturbance registration indicates to the central control unit the termination of the disturbance condition.

The preferred embodiment of the invention described hereinabove is intended only to be exemplary of the principles of the invention and not in any way to define the scope of the invention, which is defined in the appended claims.

We claim:

1. In a telephone exchange installation operated by a central control unit using electronic data processing techniques having multiple state switching matrices over which connections are completed utilizing line finding devices and having carrier frequency channels connected to the terminals of said switching matrices, said carrier frequency channels being formed into groups, which groups are each under functional control of a pilot supervision device, the improvement comprising:

memory means for storing the idle/busy conditions of all portions of said switching matrices for use in line finding, logical circuit means functioning with said memory means to form a line finding device, means in each said pilot supervision device for generating and transmitting a blocking signal responsive to a busy condition in at least one of the carrier frequency channels with which that pilot supervision device is associated and means for receiving said blocking signal and causing information to be stored in said memory indicating the switching matrix terminals to which the group of carrier frequency channels including said busy carrier frequency channel are connected to be busy.

2. The telephone exchange installation defined in claim 1 wherein said blocking signal is transmitted through said central control unit to said memory means.

3. The telephone exchange installation defined in claim 2 having a plurality of individual apparatuses formed into operating area groups, each said operating area group having an operating area control unit, including buffer memory and code conversion means, connecting the individual apparatuses in said operating area to said central control unit, the further improvement comprising:

means connecting said pilot supervision devices to respective operating area control units.

4. The telephone exchange installation defined in claim 3 wherein each said pilot supervision device communicates with the said operating area control unit associated therewith in the same manner as other individual apparatuses.

5. The telephone exchange installation defined in claim 1 wherein said pilot supervision device continually repeats said blocking signal at predetermined intervals in response to a disturbance.

6. The telephone exchange installation defined in claim 1 further comprising individual channel carrier frequency end devices directly connected to predetermined ones of said switching matrix terminals.

* * * * *